May 3, 1955  G. H. LOCKWOOD ET AL  2,707,687
METHOD OF FORMING LUMINESCENT COATING
Filed Aug. 30, 1951
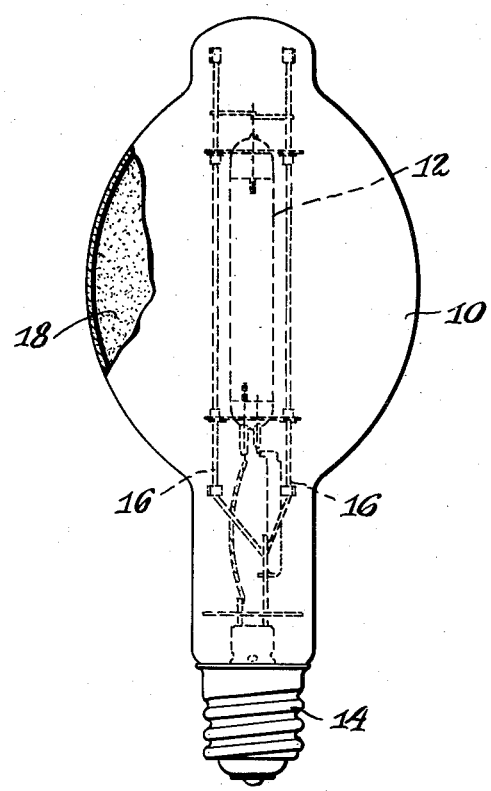
INVENTORS
G.H. LOCKWOOD
& R.E. PETERSON.
BY
Wm. P Kelly
ATTORNEY

United States Patent Office 2,707,687
Patented May 3, 1955

2,707,687

METHOD OF FORMING LUMINESCENT COATING

George H. Lockwood, Bloomfield, and Robert E. Peterson, Cedar Grove, N. J., assignors to Westinghouse Electric Corporation, East Pittsburgh, Pa., a corporation of Pennsylvania Application August 30, 1951, Serial No. 244,344

1 Claim. (Cl. 117—33.5)

Our invention relates to processes and materials for coating vitreous surfaces with luminescent materials and, more particularly, to electric discharge devices whose interior surfaces are so coated.

The usual method for coating the inside surface of bulbs or tubes for fluorescent lamps comprises coating the inside surface of the tube with a suspension of the luminescent powder in a lacquer which comprises nitro-cellulose dissolved in a solvent therefor, drying, and then baking the coating so formed until the nitro-cellulose is decomposed. However, coatings produced by this method are not satisfactory for all purposes in that the luminescent powders will subsequently chip off from the supporting surfaces.

Therefore, an object of our invention is to provide a coating of luminescent materials for a vitreous surface which coating will not be subject to chipping.

Another object of our invention is to provide a method of coating a surface with a luminescent material so that the formed coating will not subsequently chip from the surface.

The above objects, and other objects which will become apparent as the description proceeds, are achieved by coating the surface with luminescent material suspended in a vehicle containing partially hydrolyzed ethyl silicate, drying, and subsequently baking.

The novel features that we consider characteristic of our invention are set forth with particularity in the appended claim. The invention itself, however, may be best understood from the following description of specific embodiments when read in conjunction with the accompanying drawing in which the figure is a cut-away showing of a lamp which has a luminescent coating embodying our invention.

Our invention is particularly adapted for use in color-corrected mercury vapor lamps. The figure shows a color-corrected mercury vapor lamp which has an outer envelope 10 enclosing a mercury vapor tube 12. The base 14 at one end of the outer envelope 10 provides outside terminals for supplying power to the mercury tube 12 supported inside the outer envelope 10 by supports 16. The inside surface of the outer envelope 10 is covered with a coating of powdered luminescent material 18. When the luminescent material is applied to the inside surface of the outer envelope by the usual coating methods, it will tend to chip. We have found that if partially hydrolyzed ethyl silicate is added to the paint which is used to coat the surface this chipping will be prevented. This is the essence of our invention.

For example, in accordance with one embodiment of the invention the luminescent powder is suspended in a lacquer comprising an organic binder, such as nitro-cellulose, dissolved in a solvent, such as butyl acetate. Other organic binders such as ethyl or methyl cellulose may be used, and also any suitable solvent therefor. To this suspension, partially hydrolyzed ethyl silicate is added. This final paint is then drawn up through the inside of the outer envelope and allowed to drain and dry. The inside surface of the envelope now has a coating of luminescent powder thereon which contains partially hydrolyzed ethyl silicate and an organic binder. The outer envelope is than baked at a temperature at which the organic binder will be decomposed. The ordinary temperatures used to bake fluorescent bulbs, usually between 500° C. and 675° C., are satisfactory for use with our process.

More particularly, we may take 142 grams of luminescent powder and ball mill it with 130 cc. of nitro-cellulose lacquer which contains butyl acetate as a solvent and has a viscosity of 65 to 75 seconds at 25° C. measured in a Dupont #7 cup. After ball milling, preferably for one hour, we add another 200 cc. of the above nitro-cellulose lacquer and ball mill for 15 more minutes. The resulting suspension is then preferably screened through a 150 mesh screen. The viscosity of the suspension may now be adjusted to the desired value for coating by the addition of butyl acetate. The viscosity required depends on the density of the coating desired as is well known in the art.

The partially hydrolyzed ethyl silicate is then added to the suspension. The amount is not critical but we prefer to use 1% of partially hydrolyzed ethyl silicate by volume of the suspension without the ethyl silicate. Partially hydrolyzed ethyl silicate may be made by mixing 74 cc. of ethyl silicate, 24 cc. of alcohol, and 2 cc. of a 0.3%, by volume, hydrochloric acid solution in water and letting stand for 12 hours. After 12 hours 7 cc. of water are added and the product is allowed to stand another eight hours before use. The surfaces are now coated, dried, and baked at a temperature between approximately 500° C. and 675° C.

Our invention can also be used in tubes for lamps wherein the fluorescent coating is exposed directly to the mercury vapor discharge as in the ordinary fluorescent lamp. However, the resultant material formed by baking the original coating containing partially hydrolyzed ethyl silicate has great affinity for moisture. Consequently, some moisture may be held by the resultant coating and driven off during the operation of the lamp. This introduction of water vapor into a fluorescent lamp is not usually satisfactory. However, the ethyl silicate may be used in the manner described whenever the introduction of water vapor is not objectionable. Much of the moisture held by the ethyl silicate is driven off when baked at high temperatures.

The use of partially hydrolyzed ethyl silicate as contemplated by our invention is not limited to use with the nitrocellulose lacquer but it may be used with any organic binder material or wherever a permanent binder action is desired for luminescent particles. Also any organic silicate which is capable of hydrolyzation and is soluble in the solvent used without evident precipitation may be used in place of the partially hydrolyzed ethyl silicate.

While there have been others who have coated particles of luminescent material using ethyl silicate prior to their suspension in the coating vehicle in order to give them a protective coating, we are the first to use ethyl silicate as part of the painting solution in order to furnish a permanent bonding action. If ethyl silicate is used to coat the particles prior to suspension in the coating vehicle, no binding action will result and consequently chipping will not be prevented. The addition of partially hydrolyzed ethyl silicate has no adverse effects on the nitrocellulose lacquer or other organic lacquer which is used as the suspending medium.

While we have shown and described a specific embodiment of our invention, we are fully aware that many modifications thereof are possible. We do not intend to be restricted therefore, except as is necessitated by the scope and the spirit of the appended claim.

We claim:

The process of coating a surface with powdered luminescent material comprising coating said surface with a suspension of the luminescent material in a vehicle comprising a nitrocellulose lacquer and partially hydrolyzed ethyl silicate, drying, and baking the coating so formed at a temperature at which the nitrocellulose is decomposed.

References Cited in the file of this patent

UNITED STATES PATENTS

| | | |
|---|---|---|
| 2,151,496 | Beese | Mar. 21, 1939 |
| 2,329,632 | Marsden | Sept. 14, 1943 |

OTHER REFERENCES

"Ethyl Silicate," Carbide and Carbon Publication 1945, page 10.